(12) United States Patent  (10) Patent No.: US 7,518,133 B2
Giffen et al.  (45) Date of Patent: Apr. 14, 2009

(54) INTEGRATED SEARCHLIGHT LIGHTHEAD

(75) Inventors: Craig E. Giffen, Hilliard, OH (US);
Saed M. Mubaslat, Miamisburg, OH (US); Joseph L. Ferguson, Cable, OH (US); John L. Lundberg, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 376 days.

(21) Appl. No.: 11/554,548

(22) Filed: Oct. 30, 2006

(65) Prior Publication Data

US 2008/0142742 A1  Jun. 19, 2008

(51) Int. Cl.
*G01J 3/10* (2006.01)

(52) U.S. Cl. .................. 250/504 R; 362/228; 362/231; 362/240; 362/470

(58) Field of Classification Search ............. 250/504 R; 362/227, 228, 231, 240, 12, 470, 8, 241, 362/362, 365, 368, 373, 374
See application file for complete search history.

(56) References Cited

U.S. PATENT DOCUMENTS

| 4,547,701 | A | | 10/1985 | Taylor et al. | |
|---|---|---|---|---|---|
| 5,695,272 | A | * | 12/1997 | Snyder et al. | 362/231 |
| 6,315,435 | B1 | * | 11/2001 | Hamilton et al. | 362/476 |
| 6,609,812 | B2 | * | 8/2003 | Machi et al. | 362/231 |
| 6,960,776 | B2 | * | 11/2005 | Machi | 250/504 R |
| 2003/0086251 | A1 | * | 5/2003 | Hamilton et al. | 362/12 |
| 2004/0113817 | A1 | * | 6/2004 | Novak et al. | 340/983 |

FOREIGN PATENT DOCUMENTS

EP   1683720 A2   7/2006
WO   200071417 A   11/2000

* cited by examiner

*Primary Examiner*—Jack I Berman
*Assistant Examiner*—Michael J Logie
(74) *Attorney, Agent, or Firm*—Black Lowe & Graham PLLC

(57) ABSTRACT

A lighthead for a dual-mode searchlight including a generally concave housing with an attached infrared (IR) light source assembly, an insulating barrier and air gap between the visible and IR portions of the assembly, and a reflector integral to the housing.

8 Claims, 9 Drawing Sheets

INTEGRATED SEARCHLIGHT LIGHTHEAD

BACKGROUND OF THE INVENTION

Dual mode searchlights are used in rotorcraft to provide both visible lighting and infrared (IR) lighting modes, depending on the task and conditions the rotorcraft is operating under. U.S. Pat. No. 5,695,272 to Snyder et al. titled "Searchlight For Aircraft And Other Vehicles," herein incorporated by reference, describes an exemplary visible and infrared lighting element in a lamp head that may be extended, retracted, and rotated. Both light sources, however, are within the same lamp head (and the same lamp face), so that heat generated from the visible light source is not dissipated sufficiently to prevent degradation of the IR light source due to high temperatures generated by the heat from the visible light source. U.S. Pat. No. 6,962,423 to Hamilton et al. titled "Multi-mode Searchlight," herein incorporated by reference, describes a multi-mode visible and infrared lighthead for use as a landing light or searchlight. The design includes a separate reflector which must be attached to the housing, and which increases maintenance costs and time.

Therefore, there exists a need for an improved dual-mode searchlight.

SUMMARY OF THE INVENTION

Preferred embodiments of the present invention meet all of the above needs in providing a dual-mode visible and infrared (IR) searchlight assembly with an insulating barrier between the visible and IR portions of the assembly, and integral reflector.

The two illumination sources are separated with insulation material and an air gap to improve illumination performance and meet severe operating conditions. The separation provides cooling from convective heat transfer and greatly reduces conductive heat transfer from the high power visible lighting portion of the canopy to the IR illumination portion of the canopy. The IR portion of the canopy is isolated to protect the IR sources from high temperatures.

The reflective device for visible illumination is integrated into the housing to increase reflector area and reduce maintenance costs and time. The increase in reflector area has a direct positive effect on visible light intensity. Embodiments may include U.S. Pat. No. 6,960,776 to Machi titled "IR Diode Based High Intensity Light," herein incorporated by reference, which describes a high intensity, low power infrared light assembly for use on aircraft or other vehicles for landing, taxi mode, or search operations. These features contribute to reducing the size of the envelope required to harness the IR illumination sources, reducing the amount of heat generated by the searchlight, and allows the visible portion of the canopy to be larger, increasing reflector area and thus visible light intensity.

As will be readily appreciated from the foregoing summary, the invention provides an improved lighthead assembly for aircraft.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1A:
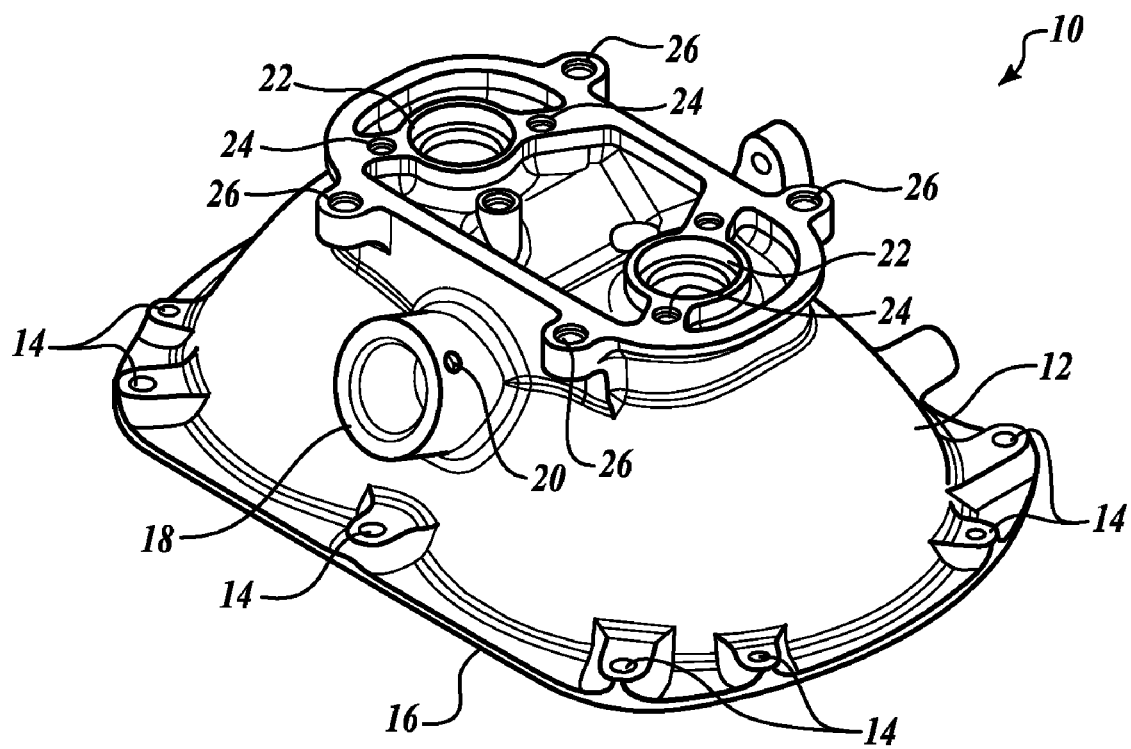
FIG. 1A is a top rear perspective view of a housing formed in accordance with an embodiment of the present invention.
Figure 1B:
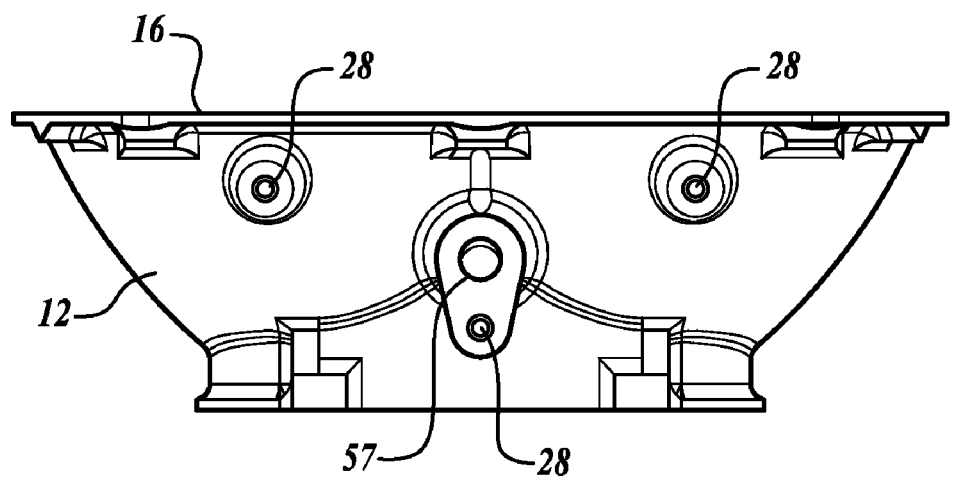
FIG. 1B is a bottom plan view of the housing of FIG. 1A.
Figure 1C:
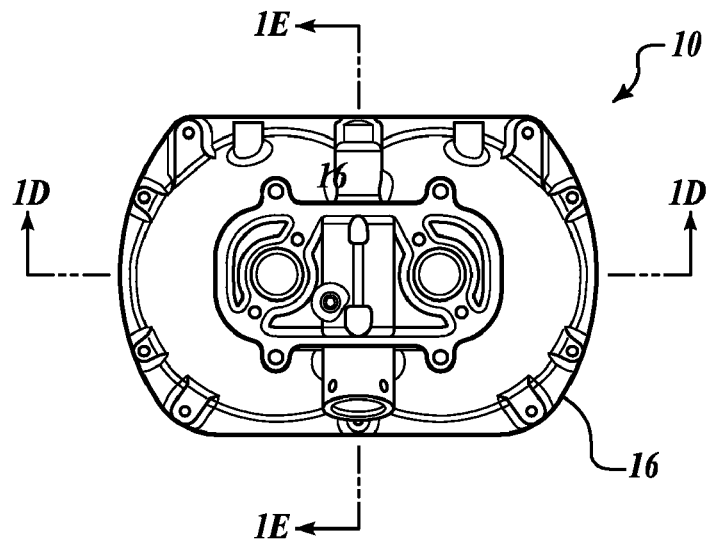
FIG. 1C is a rear plan view of the housing of FIG. 1A.
Figure 1D:
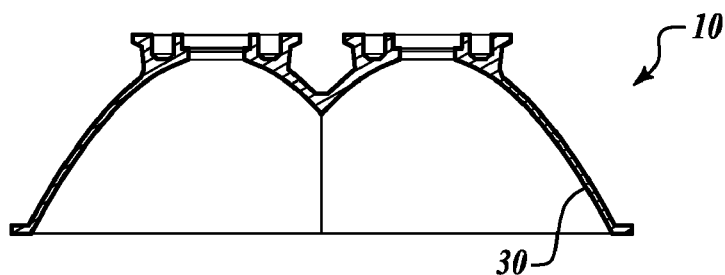
FIG. 1D is a cross-sectional view through the line 1D of FIG. 1C.
Figure 1E:
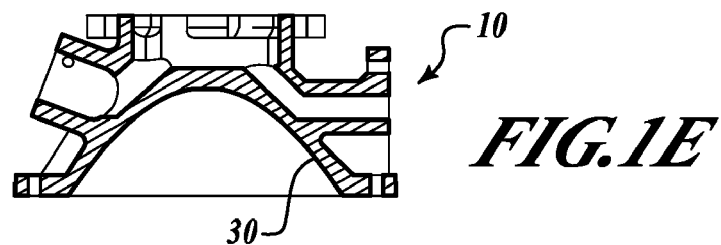
FIG. 1E is a cross-sectional view through the line 1E of FIG. 1C.
Figure 1F:
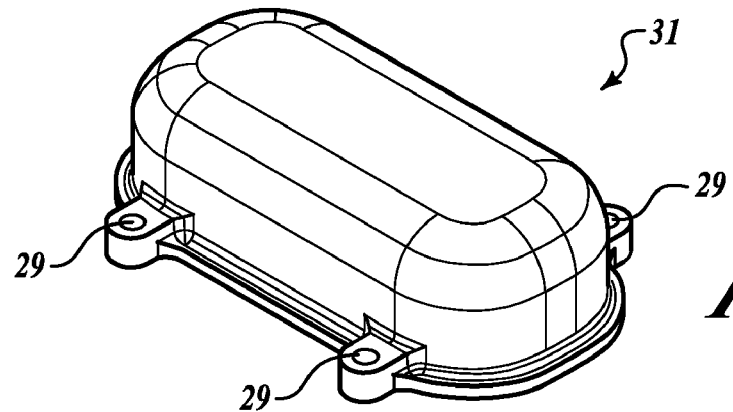
FIG. 1F is a perspective view of a housing cover formed in accordance with an embodiment of the present invention.
Figure 1G:
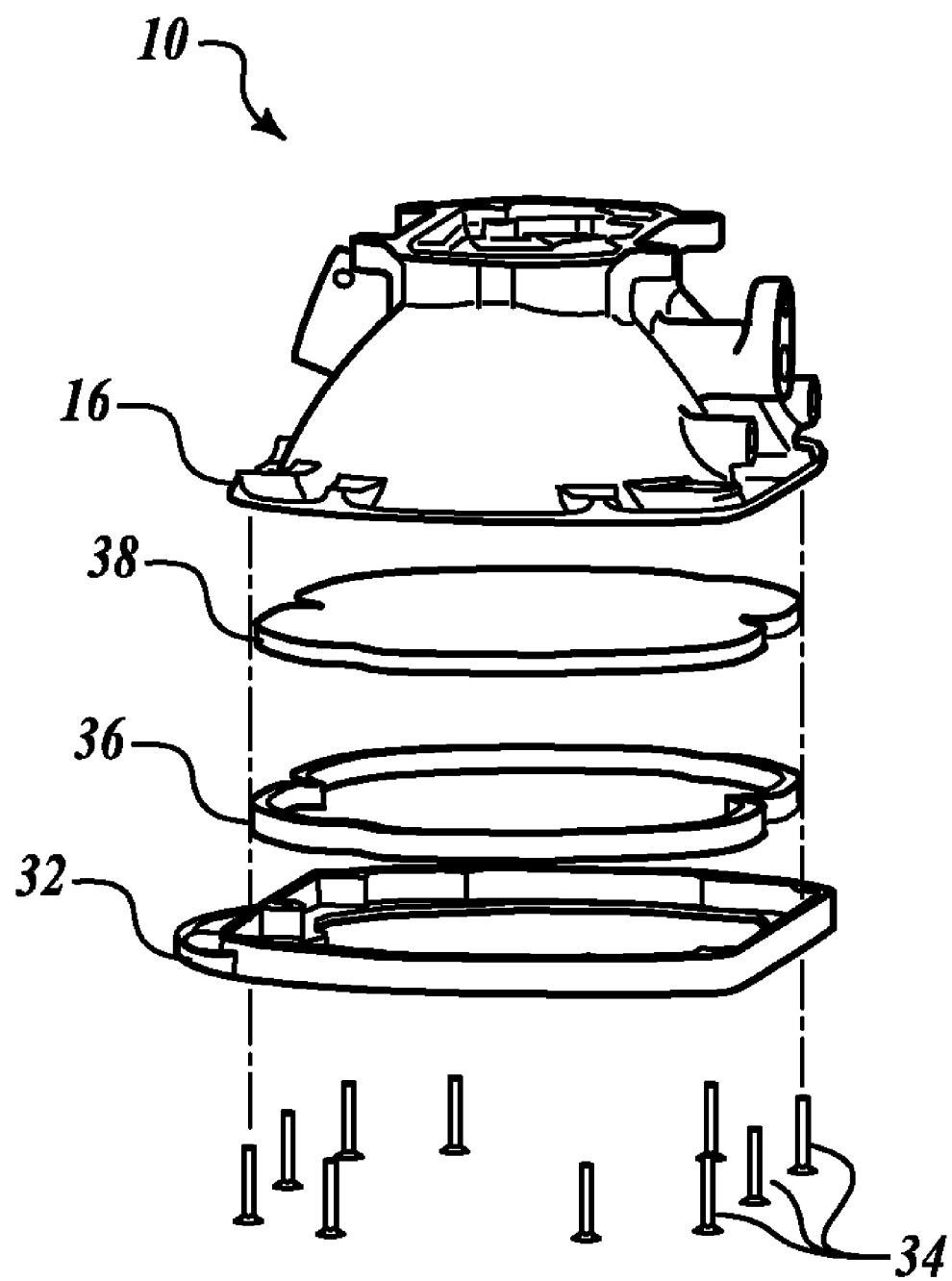
FIG. 1G is an exploded view of a housing assembly formed in accordance with an embodiment of the present invention.

FIG. 1A shows a housing 10 including a housing rear 12 defining a plurality of lens retainer attachment points 14 located around a housing perimeter 16 (FIG. 1G). The housing rear 12 also defines a searchlight slip ring shaft receptacle 18 and at least one searchlight slip ring shaft attachment point 20. The housing rear 12 also defines a pair of lamp receptacles 22, along with a plurality of lampholder attachment points 24 and housing cover attachment points 26. In FIG. 1B, the housing 10 also defines a plurality of infrared (IR) diode assembly attachment points 28. In FIGS. 1D and 1E, the housing 10 defines a reflector 30. The reflector 30 is cleaned, base coated, and then vacuum metallized. The reflector 30 should have a smooth reflective appearance and show no signs of distortion. The reflector 30 is then coated with aluminum or other suitable material known to those having skill in the art. FIG. 1F shows a housing cover 31 defining a plurality of threaded receptacles 29 through which screws 108 (FIG. 3C) may be inserted and attached to the housing cover attachment points 26.

Referring to FIG. 1G, a lens retainer 32 is attached to the housing 10 with a plurality of screws 34 at the lens retainer attachment points 14 (FIG. 1A). The lens retainer 32 holds a gasket 36 and a lens 38 in place against the housing perimeter 16.

Figure 2A:
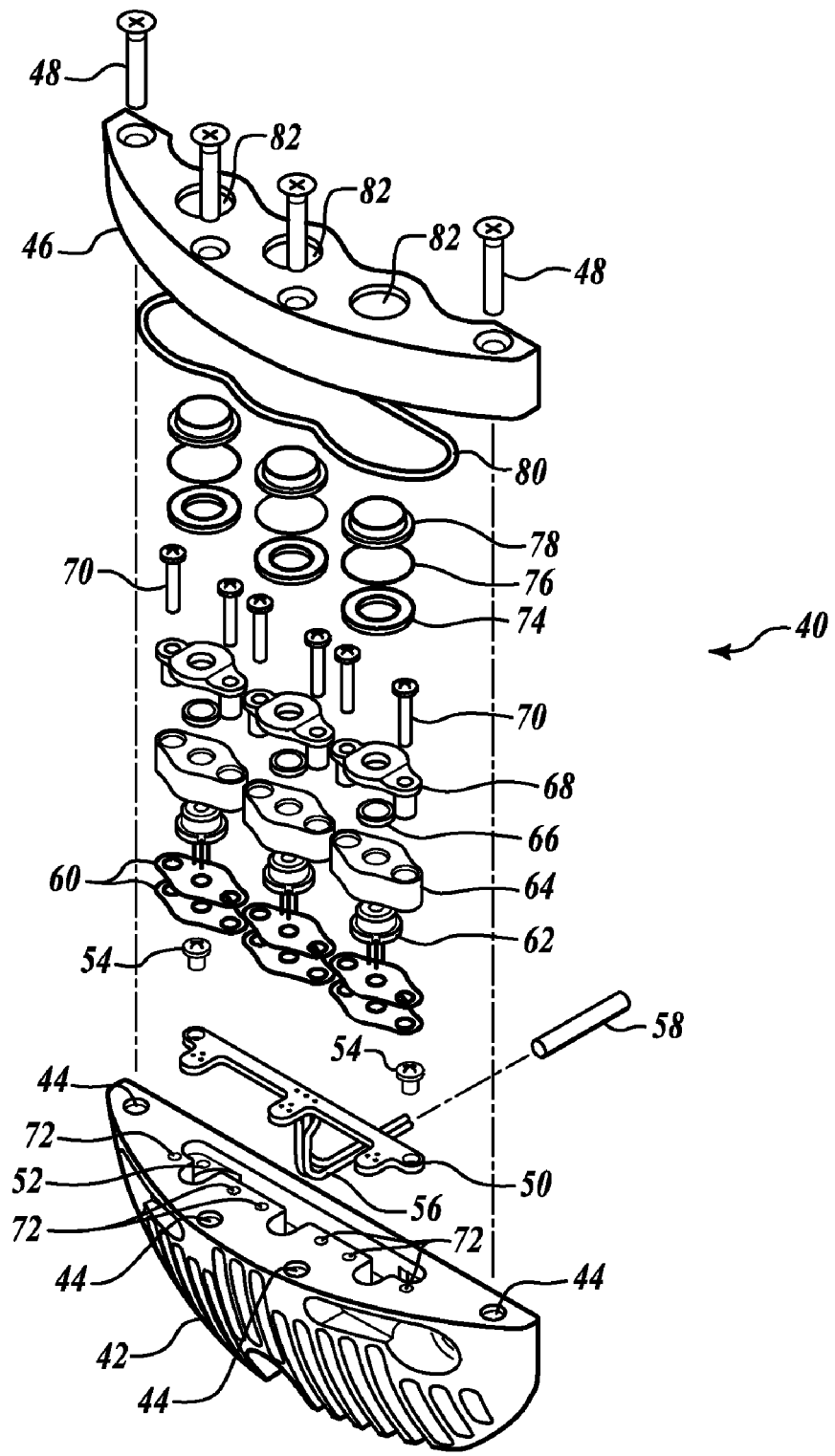
FIG. 2A is an exploded view of an infrared (IR) light source assembly formed in accordance with an embodiment of the present invention.

FIG. 2A shows an IR diode assembly 40. The assembly 40 includes an aluminum (or other suitable material) heat sink 42 defining a plurality of retainer attachment points 44. A retainer 46 is attached to the heat sink 42 at the retainer attachment points 44 with a plurality of screws 48, and houses various components of the assembly 40. A circuit card assembly 50 is attached to the heat sink 42 at a plurality of circuit card attachment points 52 with a plurality of screws 54. Wiring 56 from the circuit card assembly 50 may be encased in tubing 58. The wiring 56 exits the heat sink 42 through a wiring receptacle 57 (FIG. 2C). A plurality of thermally conductive and electrically non-conductive silicon pads 60, IR diodes 62, diode heat sinks 64, aspheric lenses 66, and diffuser retainers 68 are attached to the heat sink 42 with a plurality of screws 70 at a plurality of retainer attachment points 72. The assembly 40 includes a diode gasket 74, a light shaping diffuser 76, and a lens 78 for each diode 62; an O-ring 80 seals the components within the retainer 46, and the lenses 78 extend into lens receptacles 82 of the retainer 46. Aspheric lenses 66 and light shaping diffusers 76 act to collimate the IR energy into a desired pattern.

Figure 2B:
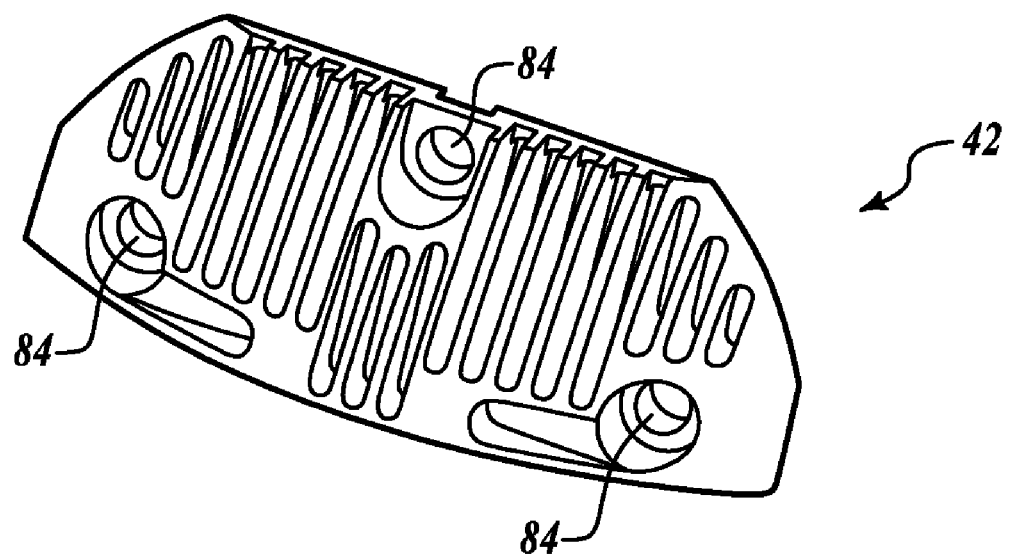
FIGS. 2B and 2C are perspective views of the heat sink of the IR light source assembly of FIG. 2A.
Figure 2C:
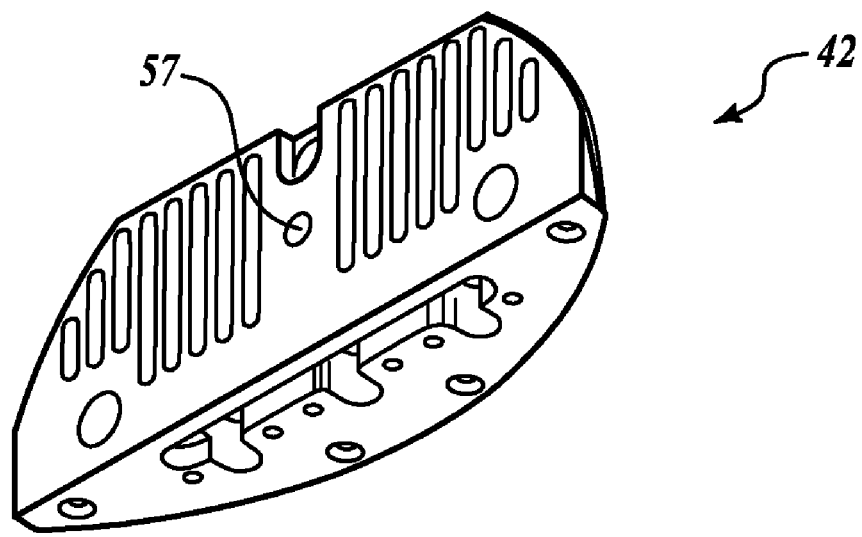

In FIGS. 2B and 2C, the heat sink 42 defines a plurality of housing attachment points 84 through which screws 88 (FIG. 3A) are inserted and attached to the IR light source assembly attachment points 28 of the housing 10 (FIG. 1B). The wiring receptacle 57 allows the wiring 56 from the circuit card assembly 50 to exit the heat sink 42.

Figure 3A:
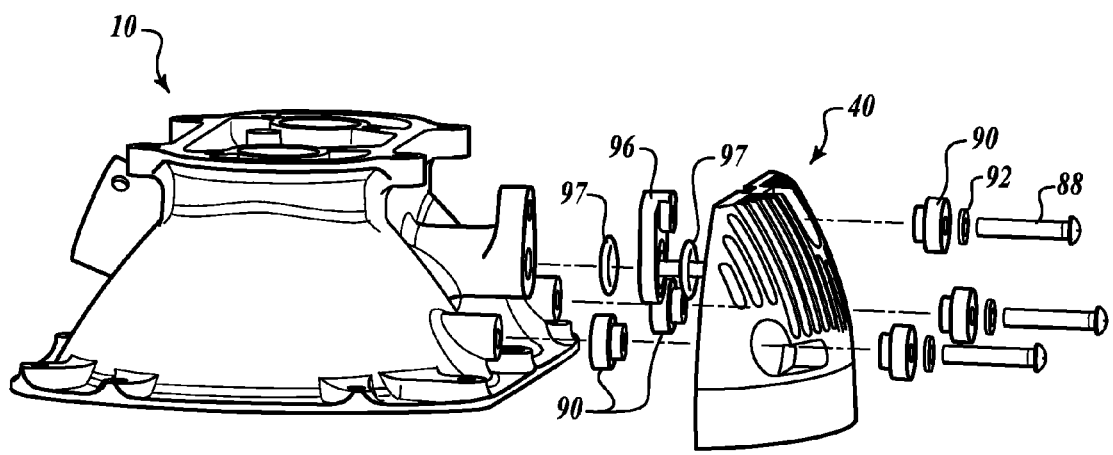
FIG. 3A is an exploded view of a housing and an IR diode assembly.

FIG. 3A shows the IR light source assembly 40 and housing 10. The IR light source assembly 40 is attached to, and only contacts the housing 10 at, the IR light source attachment points 28 of the housing 10 with a plurality of screws 88, insulating bushings 90, and washers 92. Between the housing 10 and the IR light source assembly 40, a plurality of insulating bushings 90 and an insulator 96 separate and reduce the amount of heat conduction between the canopy 10 and IR light source assembly 40. A pair of O-rings 97 seal the wiring 56. The insulating bushings 90 and insulators 96 are preferably made of polyethertherketone (PEEK) 1000, but other insulating materials known to those having ordinary skill in the art may be used.

Figure 3B:
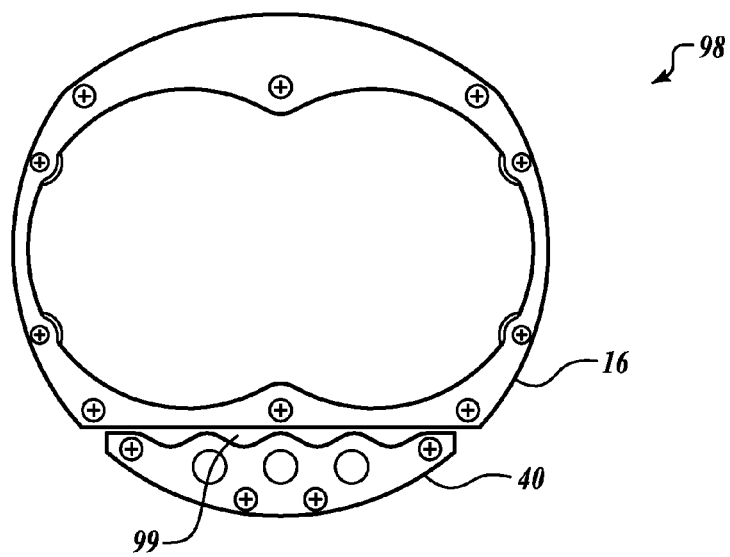
FIG. 3B is a front plan view of a lighthead assembly formed in accordance with an embodiment of the present invention.

FIG. 3B shows a lighthead assembly 98. A space 99 allows air flow between the IR light source assembly 40 and the housing perimeter 16, thus reducing the amount of heat convection between the housing 10 and the IR light source assembly 40; the space 99 also helps to prolong IR diode 62 life by reducing direct heat conduction between the housing 10 and the IR light source assembly 40. The generally circular shape of the lighthead assembly 98 allows easier adaptation of the lighthead assembly 96 to conventional dual-mode lighthead envelopes (not shown).

Figure 3C:
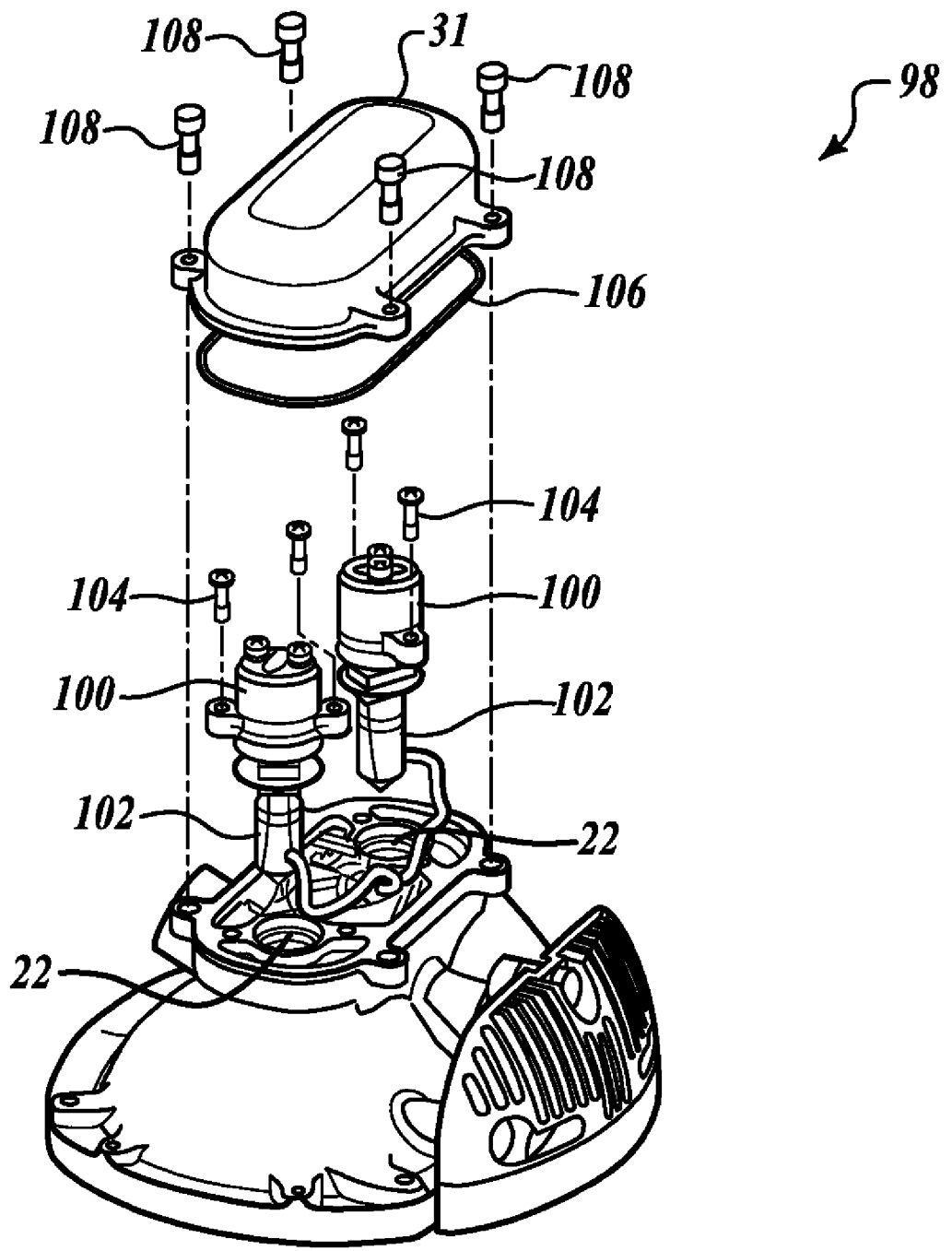
FIG. 3C is a partial exploded view of the lighthead assembly of FIG. 3B.

FIG. 3C shows the lighthead assembly 98. A pair of lampholder assemblies 100 is attached to the housing 10 with a plurality of screws 104, with lamps 102 attached to the lampholder assemblies 100 protruding through the lamp receptacles 22. The housing cover 31 and a housing cover O-ring 106 are attached to the housing 10 with a plurality of screws 108, and enclose the lampholder assemblies 100.

Figure 4A:
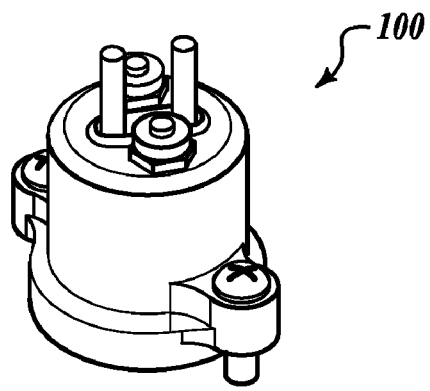
FIG. 4A is a top perspective view of a lampholder assembly formed in accordance with an embodiment of the present invention.
Figure 4B:
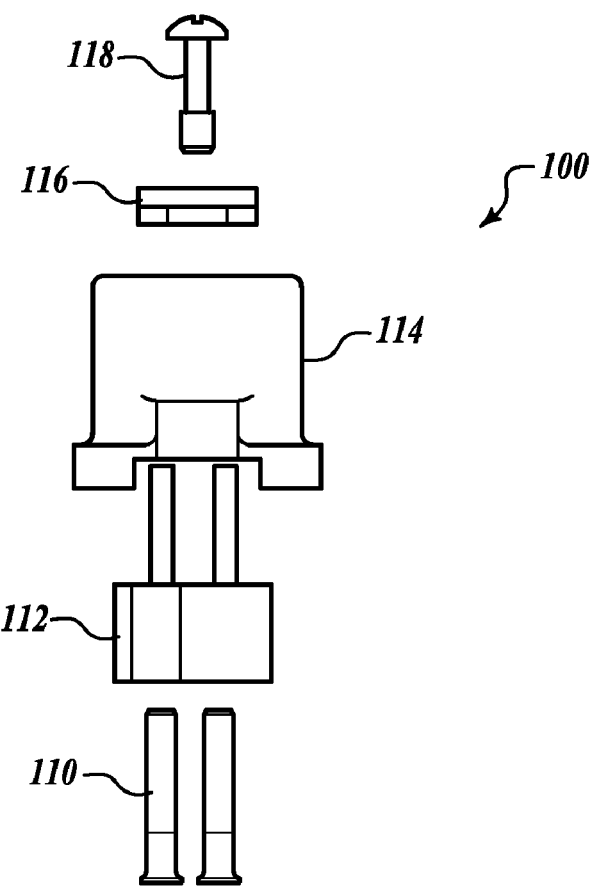
FIG. 4B is an exploded view of the lampholder assembly of FIG. 4A.

FIGS. 4A and 4B show one lampholder assembly 100. The assembly 100 includes screws 110 attaching a socket 112 to a lampholder 114 via self-locking nuts 116. Screws 118 secure the lampholder 114 to the housing 10 (FIG. 1A).

Figure 5A:
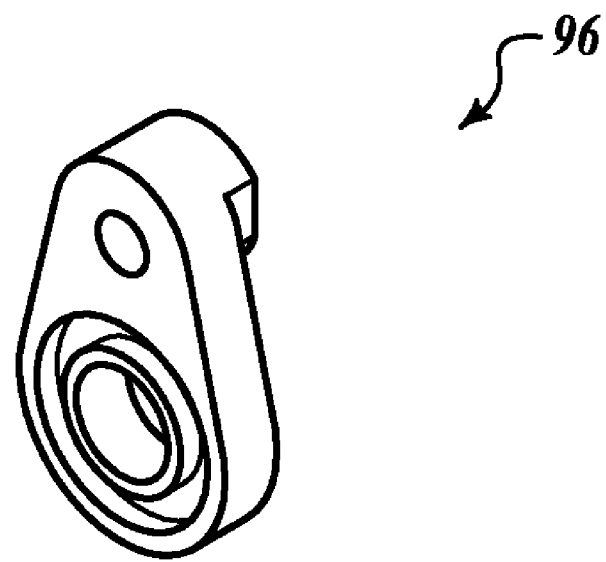
FIG. 5A is an insulator formed in accordance with an embodiment of the present invention.
Figure 5B:
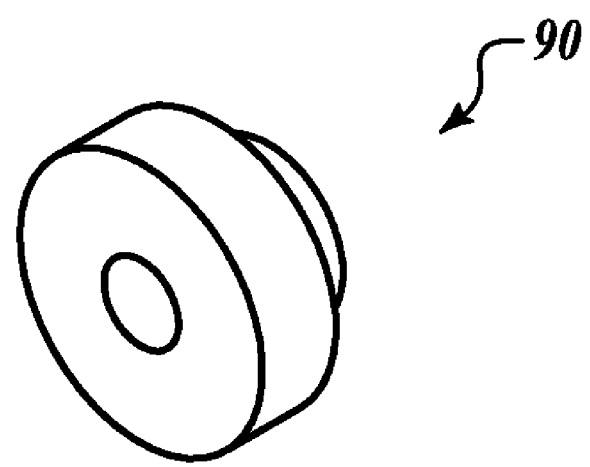
FIG. 5B is an insulating bushing formed in accordance with an embodiment of the present invention.

FIGS. 5A and 5B show an insulator 96 and an insulating bushing 90, respectively. In an embodiment, the insulator 96 and insulating bushing 90 are made of polyethertherketone (PEEK) 1000, but could be made of any of a variety of different insulating materials.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A lighthead, comprising:
   a generally concave housing defining a front side, a front perimeter, and a rear side, the housing comprising:
   a reflector located on the front side;
   a plurality of lens retainer attachment points located around the front perimeter;
   at least one lamp receptacle extending through the housing and a plurality of lampholder assembly attachment points located on the rear side of the housing;
   at least one infrared (IR) light source assembly attachment point located on the rear side of the housing; and
   at least one slip ring shaft attachment point located on the rear side of the housing;
   an infrared (IR) light source assembly attached to the at least one IR light source assembly attachment point and configured to emit infrared light;
   a housing lens assembly attached to the front perimeter of the housing at the plurality of lens retainer attachment points,
   wherein the IR light source assembly is attached to and insulated and spaced apart from the housing with a plurality of screws, a plurality of insulating bushings, and at least one insulator.

2. The lighthead of claim 1, further comprising at least one housing cover attachment point located on the rear side of the housing.

3. The lighthead of claim 1, the IR light source assembly further comprising:
   a heat sink including at least one housing attachment point and at least one retainer attachment point;
   at least one IR diode configured to emit infrared light and at least one diode lens covering the at least one IR diode; and
   a retainer for receiving at least one diode lens and for holding the at least one IR diode and the at least one diode lens securely in place when the retainer is attached to the heat sink.

4. The lighthead of claim 3, the heat sink further including an outer surface, a portion of the outer surface configured such that when the IR light source assembly is attached to the housing, air may flow in between the housing and the surface of the heat sink.

5. The lighthead of claim 3, wherein the at least one IR diode emits infrared light that is non-coherent and non-directional, and the at least one diode lens is a collimating lens adapted to collimate infrared light to produce a beam of infrared light output from the light assembly.

6. The lighthead of claim 1, the housing lens assembly further comprising:
   a translucent lens configured to allow the passage of visible light through the lens;
   a lens retainer configured to hold the translucent lens securely in place between the lens retainer and the housing when the lens retainer is attached to the housing.

7. The lighthead of claim 1, wherein a surface of the reflector is generally smooth and metallized.

8. A lighthead, comprising:
   a visible light source housing;
   an infrared (IR) light source housing;
   wherein the IR light source housing is attached to the visible light source housing with a plurality of screws, insulating bushings, and at least one insulator, such that the IR light source housing is spaced apart from and insulated from the visible light source housing.

* * * * *